(12) United States Patent
Stamer

(10) Patent No.: US 6,637,588 B1
(45) Date of Patent: Oct. 28, 2003

(54) FOLDED PAPER BOARD CD CARRIER AND METHOD OF MAKING THE SAME

(75) Inventor: Laura A. Stamer, Chicago, IL (US)

(73) Assignee: R. R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 09/875,682

(22) Filed: Jun. 6, 2001

(51) Int. Cl.[7] .............................................. B65D 85/57
(52) U.S. Cl. .................... 206/308.1; 206/312
(58) Field of Search .......................... 206/308.1, 309, 206/310–313, 493, 425

(56) References Cited

U.S. PATENT DOCUMENTS

| | | |
|---|---|---|
| 1,495,953 A | 5/1924 | Dick |
| 1,554,995 A | 9/1925 | Fetters |
| 2,318,677 A * | 5/1943 | Delson ........................ 206/425 |
| 2,333,798 A * | 11/1943 | Kner ........................... 206/425 |
| 2,600,023 A | 6/1952 | Rice |
| 2,615,564 A | 10/1952 | Post |
| 3,303,603 A | 2/1967 | Abeson |
| 3,717,297 A | 2/1973 | Perry |
| 3,785,478 A | 1/1974 | Drori |
| 3,870,223 A | 3/1975 | Wyant |
| 4,049,120 A | 9/1977 | Bower |
| 4,062,447 A | 12/1977 | Gardner |
| 4,159,768 A | 7/1979 | Manis |
| 4,420,112 A | 12/1983 | Cline |
| 4,508,366 A | 4/1985 | Brindle |
| 4,577,889 A | 3/1986 | Schulz |
| 4,709,812 A | 12/1987 | Kosterka |
| 4,743,048 A | 5/1988 | Groswith, III |
| 4,962,951 A | 10/1990 | Mechesney |
| 5,101,973 A | 4/1992 | Martinez |
| 5,154,284 A | 10/1992 | Starkey |
| 5,188,229 A | 2/1993 | Bernstein |
| 5,199,743 A | 4/1993 | Rosinski, III |
| 5,248,032 A | 9/1993 | Sheu et al. |
| 5,307,927 A | 5/1994 | Curtis et al. |
| 5,333,728 A | 8/1994 | O'Brien et al. |
| 5,419,433 A | 5/1995 | Harrer et al. |
| 5,421,453 A | 6/1995 | Harrer et al. |
| 5,472,083 A | 12/1995 | Robinson et al. |
| 5,620,271 A | 4/1997 | Bergh et al. |
| 5,641,063 A | 6/1997 | Gambardella et al. |
| 5,647,482 A | 7/1997 | Kleinfelder |
| 5,662,217 A | 9/1997 | Durr |
| 5,662,218 A | 9/1997 | Ladwig |
| 5,685,424 A | 11/1997 | Rozek et al. |
| 5,749,463 A | 5/1998 | Collins |
| 5,775,490 A | 7/1998 | Baker et al. |
| 5,882,038 A | 3/1999 | Ong |
| 5,887,714 A | 3/1999 | Yeo |
| 5,988,375 A | 11/1999 | Chang |

* cited by examiner

Primary Examiner—Shian Luong
(74) Attorney, Agent, or Firm—Marshall, Gerstein & Borun LLP

(57) ABSTRACT

A device for carrying a compact disc having a central aperture and a method of forming the same are provided. The device comprises a blank formed from a single piece of paper board stock, with the blank including a plurality of fold lines dividing the blank into a plurality of panels. A first one of the panels and a second one of the panels are foldable along a first one of the fold lines to a confronting position, with the first and second panels cooperating to form a pocket therebetween when in the confronting position. At least one of the first and second panels defines a receiving area and includes a receiving aperture. A third one of the panels is foldable along a second one of the fold lines to a folded position overlying the receiving area. The third panel includes an elongated protrusion sized for insertion through the receiving aperture and into the pocket. A compact disc may be secured adjacent the receiving by inserting the elongated protrusion through the central aperture of the compact disc, through the receiving aperture, and into the pocket.

18 Claims, 10 Drawing Sheets

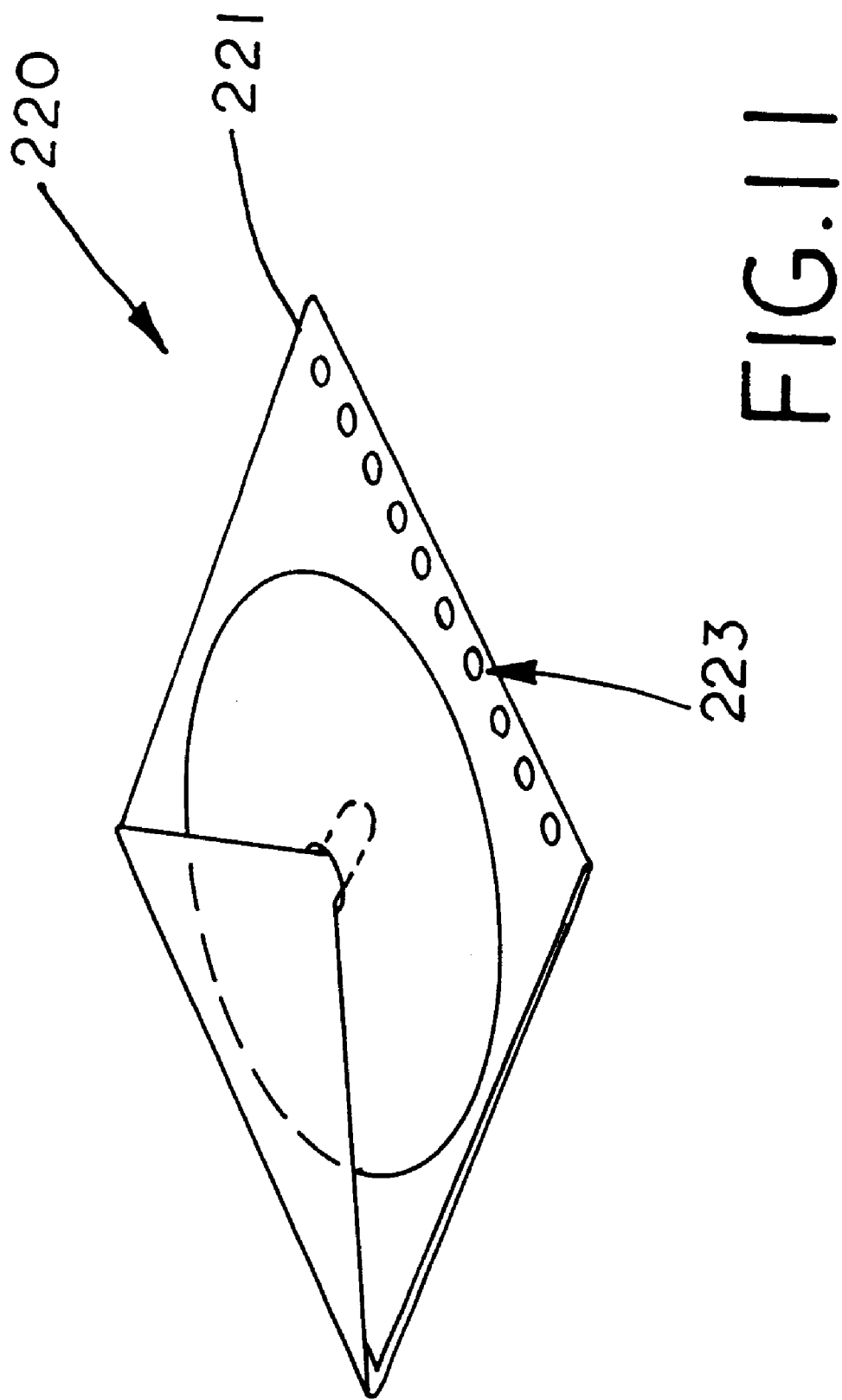

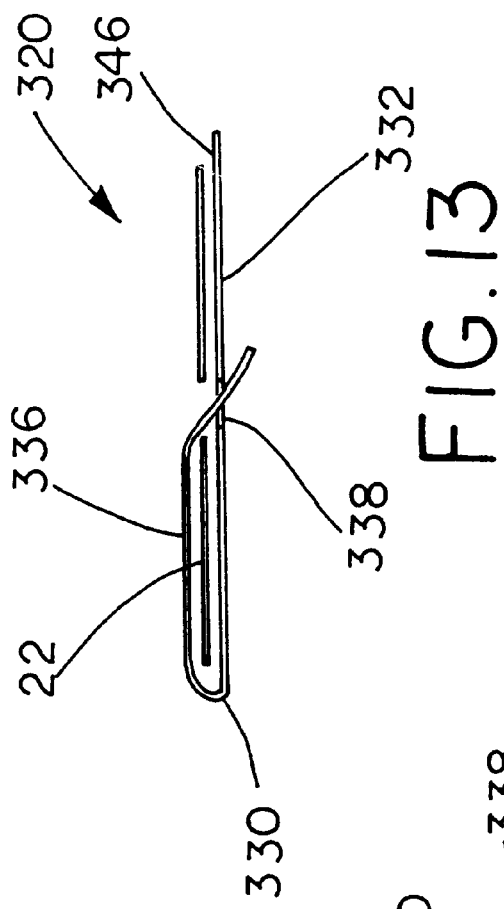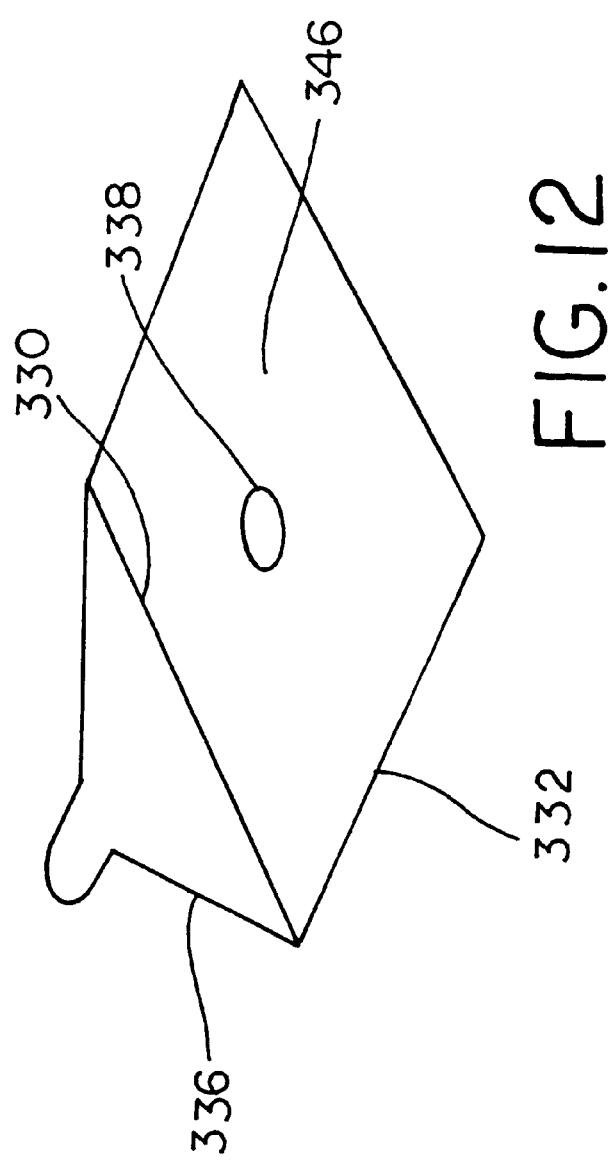

FOLDED PAPER BOARD CD CARRIER AND METHOD OF MAKING THE SAME

FIELD OF THE INVENTION

The present invention relates to a folded paper board device for holding articles such as compact discs, and more specifically, to a compact disc (CD) carrier device suitable for use as a CD mailer.

BACKGROUND OF THE INVENTION

Compact discs, which are commonly referred to as "CD's" are generally well known in the art. Standard CD's having a nominal diameter of about four and three quarters (4¾) inches are commonly used to store prerecorded music, prerecorded video (commonly referred to as digital video discs or "DVD's"), and data for reading by a computer. All may be referred to collectively as CD's. Due to technical advances, a CD can store an incredible amount of data, and thus CD's are greatly preferred over other storage mediums, such as, by way of example, magnetic recording tape.

It is well known that CD's are commonly employed as a convenient medium for storing computer software, and, owing to the capacity of CD's to store such great amounts of data, CD's are commonly employed to store all of the data necessary for a wide variety of applications. For example, CD's are often used to store data for entire sets of encyclopedias, dictionaries, legal treatises, legal reporters, maps, games, etc., not to mention to store music for CD players and to store entire movies for viewing with DVD players. Many other applications are also well known.

Owing to the advances in technology that have given rise to the proliferation of CD's as a storage medium, the purveyors of the above-described items, such as book and magazine publishers, music companies, video companies, software companies, and internet-related service providers and search engines now frequently mail their goods on CD's directly to consumers. Accordingly, there is a continuing need for cost-effective yet secure packaging in which to mail CD's to the end user.

BRIEF DESCRIPTION OF THE DRAWINGS

FIG. 11 is a perspective view of a folded paperboard CD carrier constructed in accordance with the teachings of a third disclosed embodiment of the present invention;

FIG. 12 is a perspective view of a folded paperboard CD carrier constructed in accordance with the teachings of a yet another disclosed embodiment of the present invention; and FIG. 13 is a schematic cross-sectional view thereof.

DETAILED DESCRIPTION OF THE PREFERRED EMBODIMENTS

Figure 1:
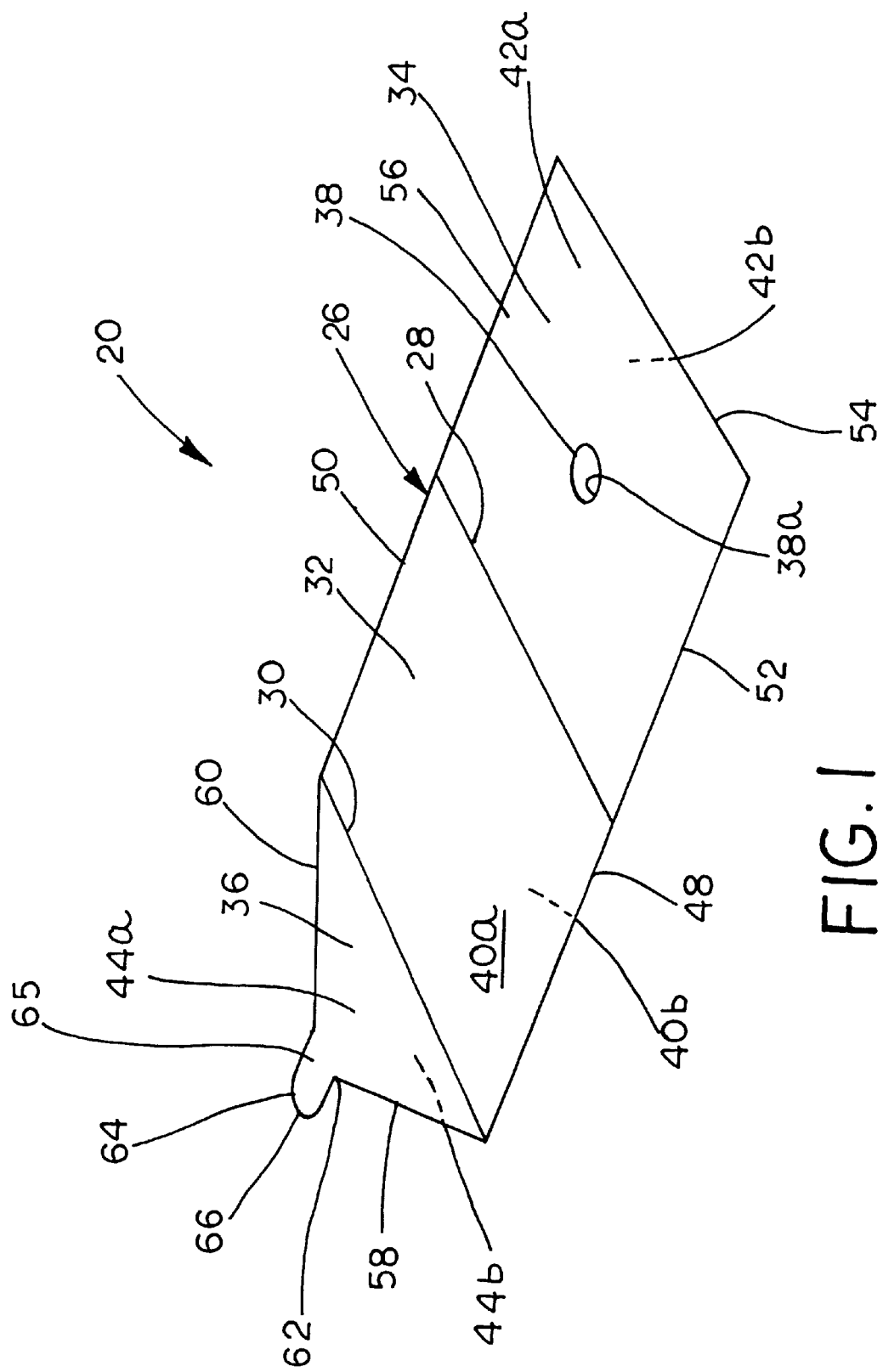
FIG. 1 is a perspective view of a folded paperboard CD carrier constructed in accordance with the teachings of a first disclosed embodiment of the present invention and shown in an unfolded state.
Figure 2:
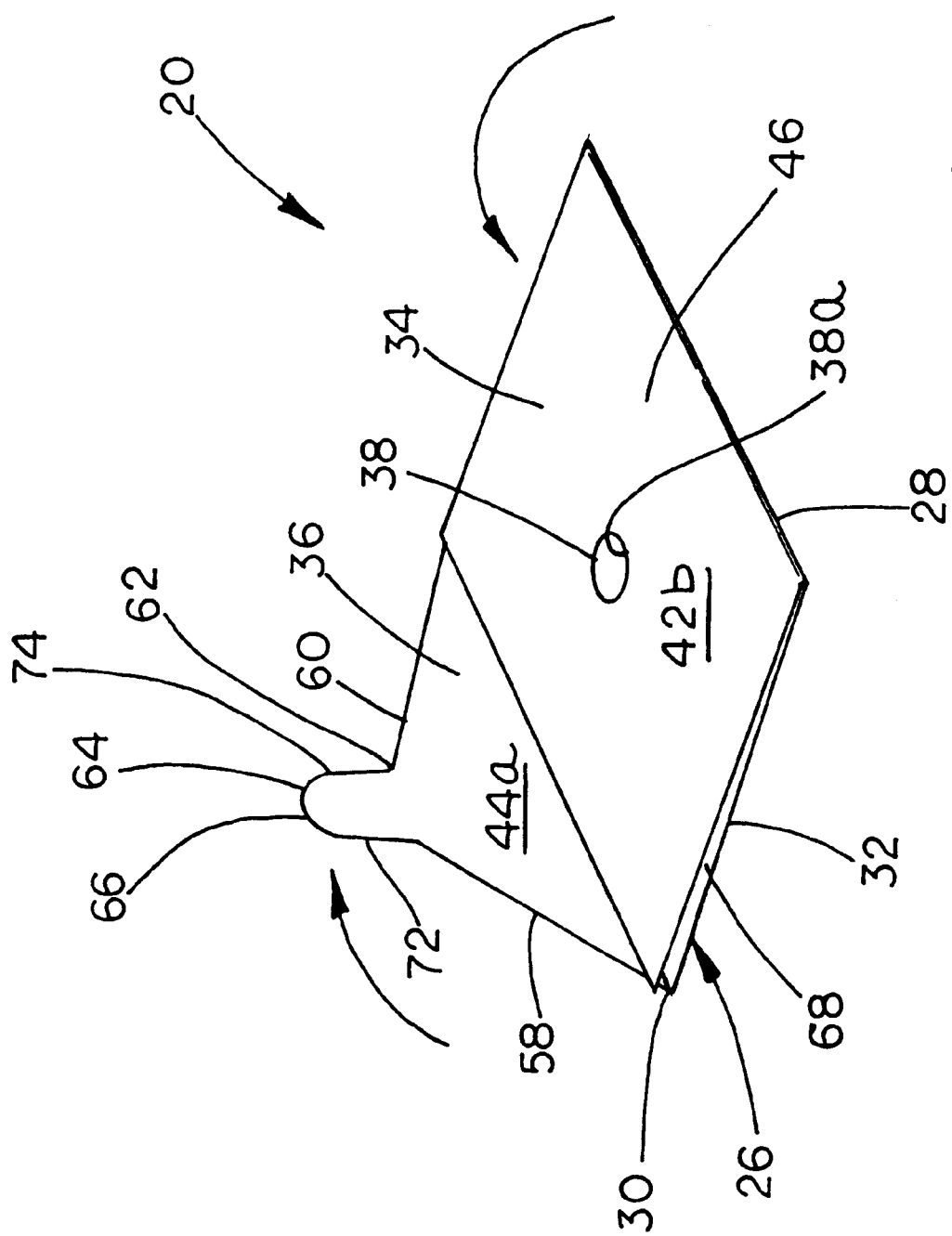
FIG. 2 is a perspective view similar to FIG. 1 but illustrating the CD carrier in one possible partially folded state.

The embodiments described herein are not intended to be exhaustive or to limit the scope of the invention to the precise forms disclosed. Rather, the following embodiments have been chosen and described in order to best illustrate the principles of the invention and to enable others skilled in the art to follow the teachings thereof.

Referring now to FIGS. 1–7 of the drawings, a CD carrier constructed in accordance with the teachings of a first disclosed embodiment of the present invention is generally referred to by the reference numeral 20. The CD carrier 20 may be used to carry a compact disc 22 (viewable in FIGS. 3 and 6, and hereinafter referred to as a "CD") which is commonly used in the art to store machine readable data. It will be noted that the CD 22 will typically have a central aperture 24 having a nominal diameter of about 1.5 centimeters.

The CD carrier 20 is constructed of a paper or paperboard blank 26. The blank 26 is preferably formed from a single piece of stock, and still preferably may be constructed of eighteen (18) point stock. The blank 16, when positioned flat or fully unfolded as shown in FIG. 1, may be generally rectangular in shape. The blank 26 includes a pair of fold lines 28 and 30. The fold lines 28 and 30 divide the blank 26 into a plurality of panels, which in the embodiment shown includes panels 32, 34, and 36.

The panel 34 is foldable with respect to the panel 32 along the fold line 28, while the panel 36 is foldable with respect to the panel 32 along the fold line 30. The panel 34 includes a receiving aperture 38. In the disclosed embodiment, the receiving aperture may have a diameter approximately equal to the diameter of the central aperture 24. The panel 32 includes a first face 40a and a second face 40b, the panel 34 includes a first face 42a and a second face 42b, and the panel 36 includes a first face 44a and a second face 44b. As shown in FIGS. 2, 3, 5 and 6, the second face 42b of the panel 34 defines a receiving area 46, which receiving area 46 will be positioned to receive the CD 22 in the manner to be more fully explained below.

Figure 4:
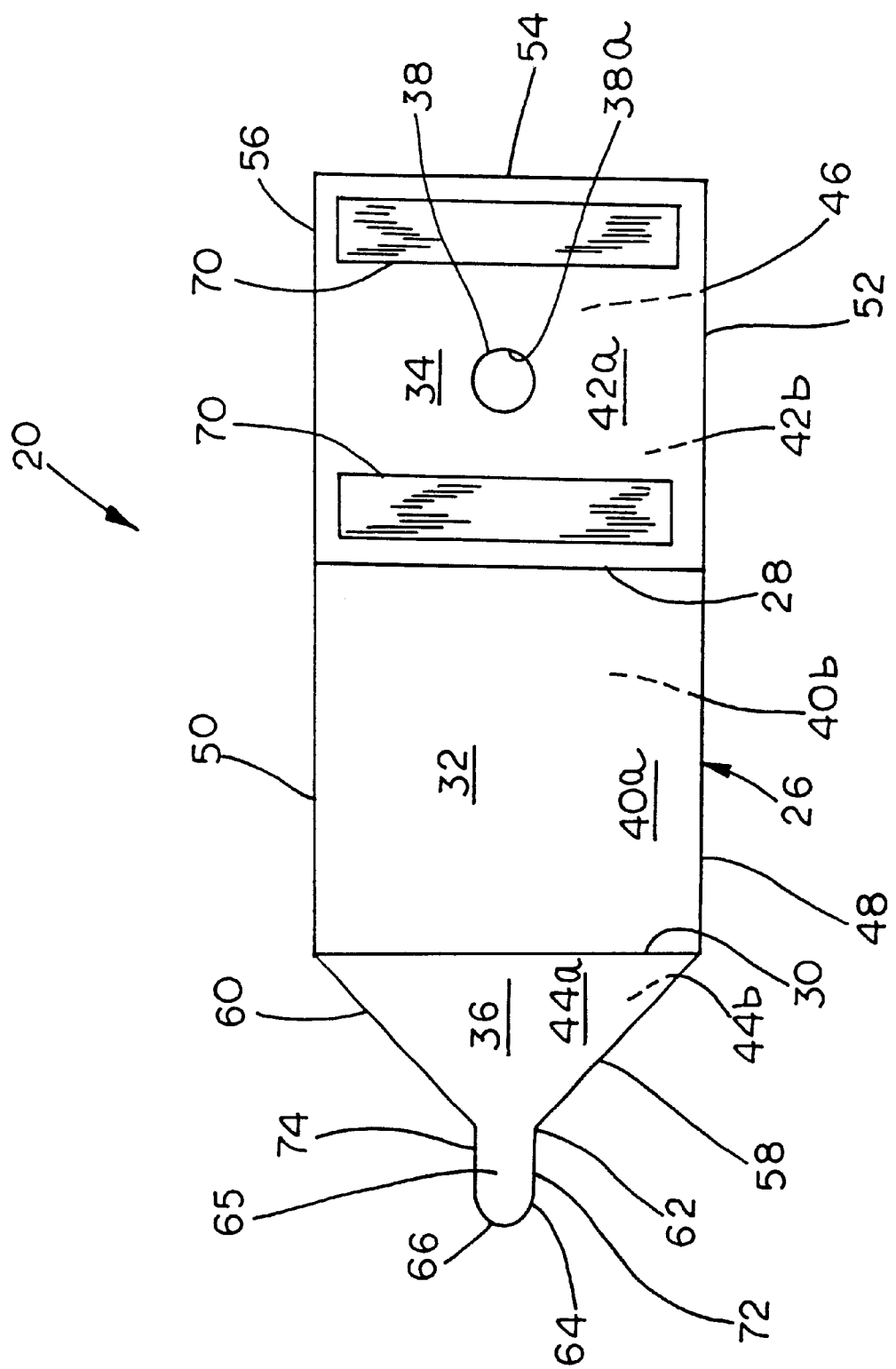
FIG. 4 is a top plan view of the CD carrier shown in an unfolded state.

As shown in FIGS. 1 and 4, the panel 32 is bounded by the fold lines 28 and 30, and also by edges 48 and 50. The panel 34 is bounded by the fold line 28, and also by edges 52, 54 and 56. Finally, the panel 36 is bounded by the fold line 30, and by a pair of edges 58, 60, which converge toward a base or root 62 of a protrusion 64. The protrusion 64 preferably includes an elongated portion 65 which terminates in a rounded tip 66. The rounded tip 66 will preferably have a radius roughly equivalent to the radius of the central aperture 24 of the CD 22.

Referring now to FIGS. 2, and 5–7, when the panel 34 is folded along the fold line 28, a pocket 68 is formed by the panels 32 and 34. More specifically, the pocket 68 is formed by the face 42a of the panel 34 and the face 40a of the panel 32. It will be noted that, for ease of illustration, the thickness of the blank 26 as well as the space between the adjacent panels 32, 34, and 36 have been exaggerated in FIGS. 5–7.

Referring now to FIG. 4, the face 42a of the panel 34 preferably includes a pair of adhesive strips 70. The adhesive strips may be a double coated film such as is sold under the Scotch® brand name, or, in the alternative, a line of adhesive covered with release tape may be used. Further, the adhesive strips may be applied to the face 40a of the panel 32. As a still further alternative, strips of hook and loop closure material (not shown) may be employed, or any other suitable adhesive system of mechanical fasteners may be employed, in order to maintain the panels 32, 34 in the confronting position illustrated in FIG. 2. As another alternative, other conventional gluing or attachment methods may be used. Finally, in some applications the strips 70 may be dispensed with entirely.

Referring now to FIG. 4, the elongated portion 65 of the protrusion 64 includes a pair of spaced apart edges 72, 74. In the disclosed embodiment, the edges 72, 74 are spaced apart so that the width of the elongated section roughly matches the diameter of the receiving aperture 38 in the panel 34.

Figure 5:
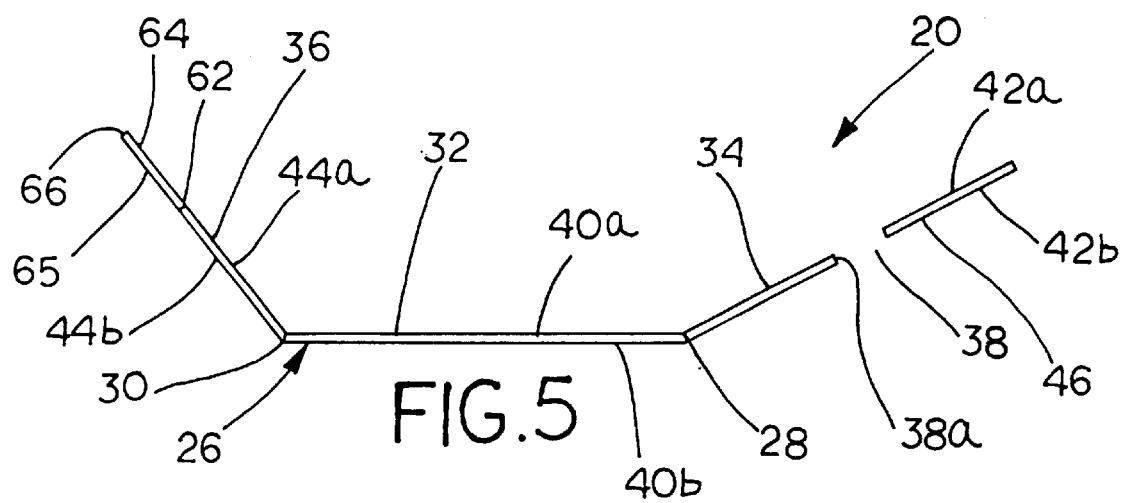
FIG. 5 is a schematic cross-sectional view of the CD carrier shown in FIGS. 1–4 and shown in a generally unfolded state.
Figure 6:
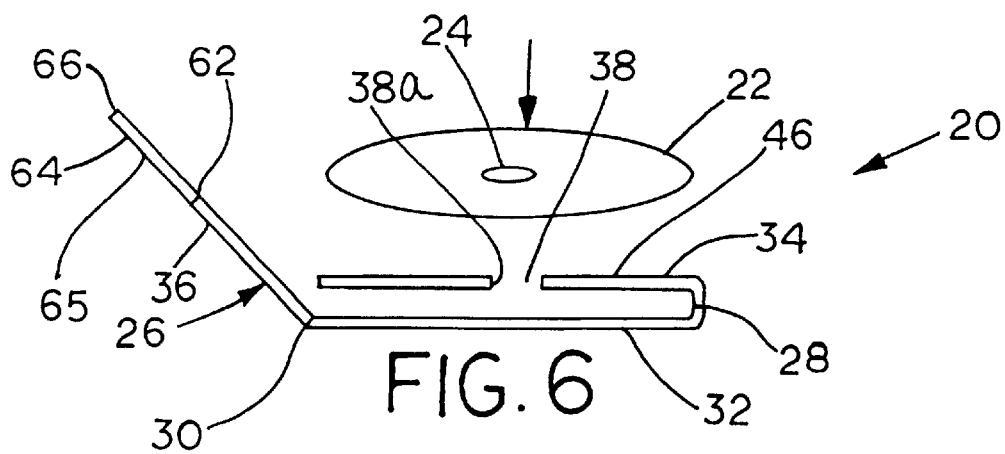
FIG. 6 is a schematic cross-sectional view similar to FIG. 5 but illustrating a compact disc being positioned on the compact disc carrier.

In operation, the device 20 may be formed by stamping, forming or otherwise cutting the blank 26 from a single piece of stock. The strips 70 of adhesive may then be applied to the appropriate face, such as the face 42a of the panel 34. As shown in FIGS. 5 and 6, the panel 34 is folded along the fold line 28, which places the panel 34 over the panel 32, with the face 42a of the panel 34 facing the face 40a of the panel 32, thereby forming the pocket 68. When so positioned, the receiving area 46 now faces upwardly when viewing the FIGS. The panels are secured in place by the adhesive strips 70. As shown in FIG. 6, the CD 22 may now be placed adjacent the receiving area 46.

When the CD 22 is placed on the receiving area 46, the aperture 24 of the CD 22 is generally aligned with the receiving aperture 38 located in the panel 34. Subsequently, the panel 36 is folded along the fold line 30, and the protrusion 64 is manipulated to extend through both the aperture 24 of the CD 22 and the receiving aperture 38 in the panel 34. Owing to the flexibility of the paperboard stock, the panel 36 and the protrusion 64 are slightly flexible and will deflect slightly, enabling the protrusion 64 to be inserted through the apertures 24 and 38. The CD 22 is thus secured to the CD carrier 20 as shown in FIG. 3.

Figure 3:
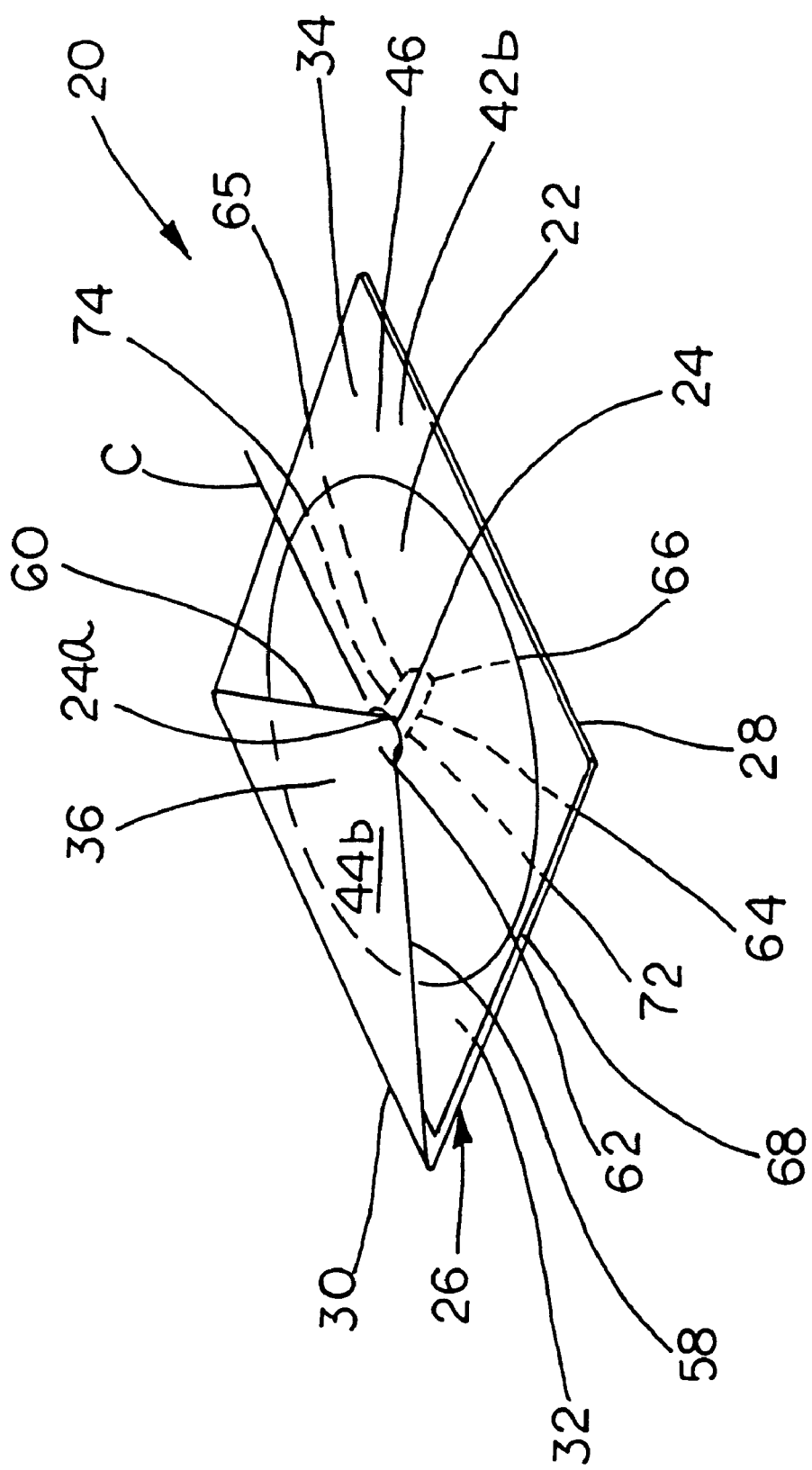
FIG. 3 is a perspective view similar to FIG. 2 but showing a CD secured to the CD carrier.
Figure 7:
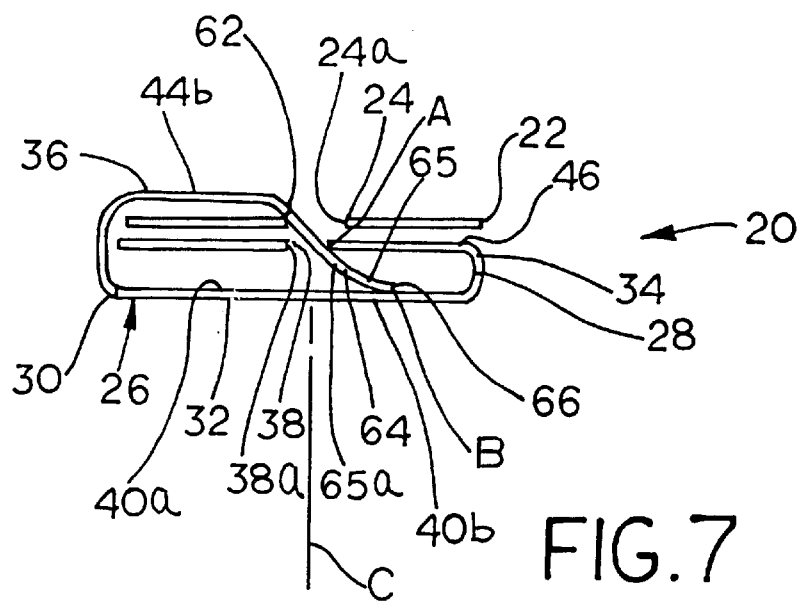
FIG. 7 is a schematic cross-sectional view similar to FIGS. 5 and 6 and illustrating the compact disc secured in place in the CD carrier.

As shown in FIGS. 3 and 7, the protrusion 64 extends into the pocket 68. As shown in FIG. 3, the root 62 is positioned roughly at the center C of the aperture 24 of the CD. Further, the edges 72, 74 will preferably frictionally engage an inner edge 24a of the central aperture 24 of the CD 22, and will further frictionally engage an inner edge 38a of the receiving aperture 38 in the panel 34.

As shown in FIG. 7, when the protrusion 64 is disposed in the pocket 68, the protrusion 64 may be slightly deformed at the root 62 and/or along a central portion 65a of the elongated section 65. At least a portion of the protrusion 64 may also experience frictional forces at the contact points A (adjacent the inner edge 38a of the receiving aperture) and B against the face 40a of the panel 32. These frictional forces may help to prevent inadvertent withdrawal of the protrusion from the pocket 68.

Figure 8:
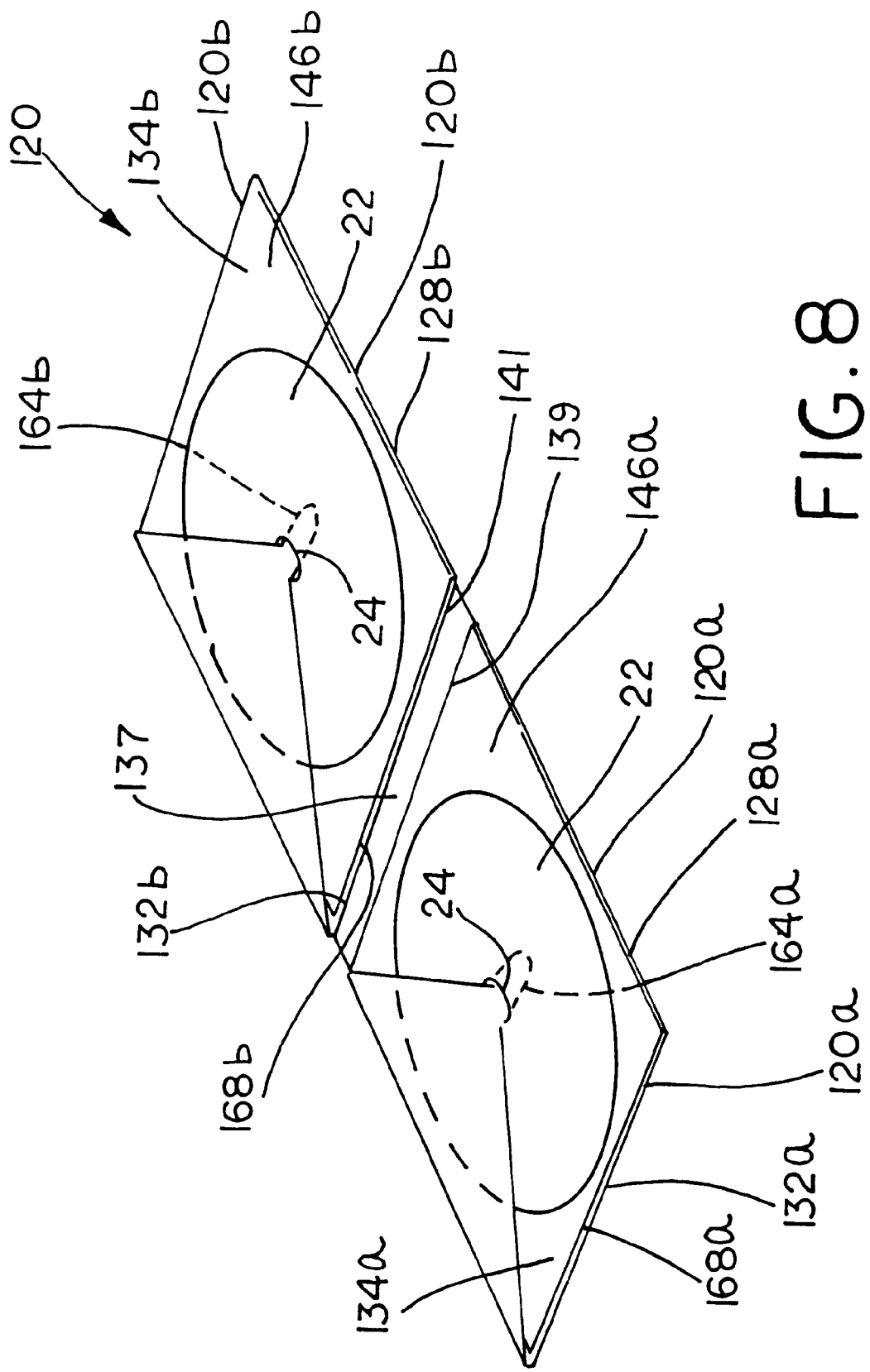
FIG. 8 is a perspective view of a folded paperboard CD carrier constructed in accordance with the teachings of a second disclosed embodiment of the present invention.
Figure 9:
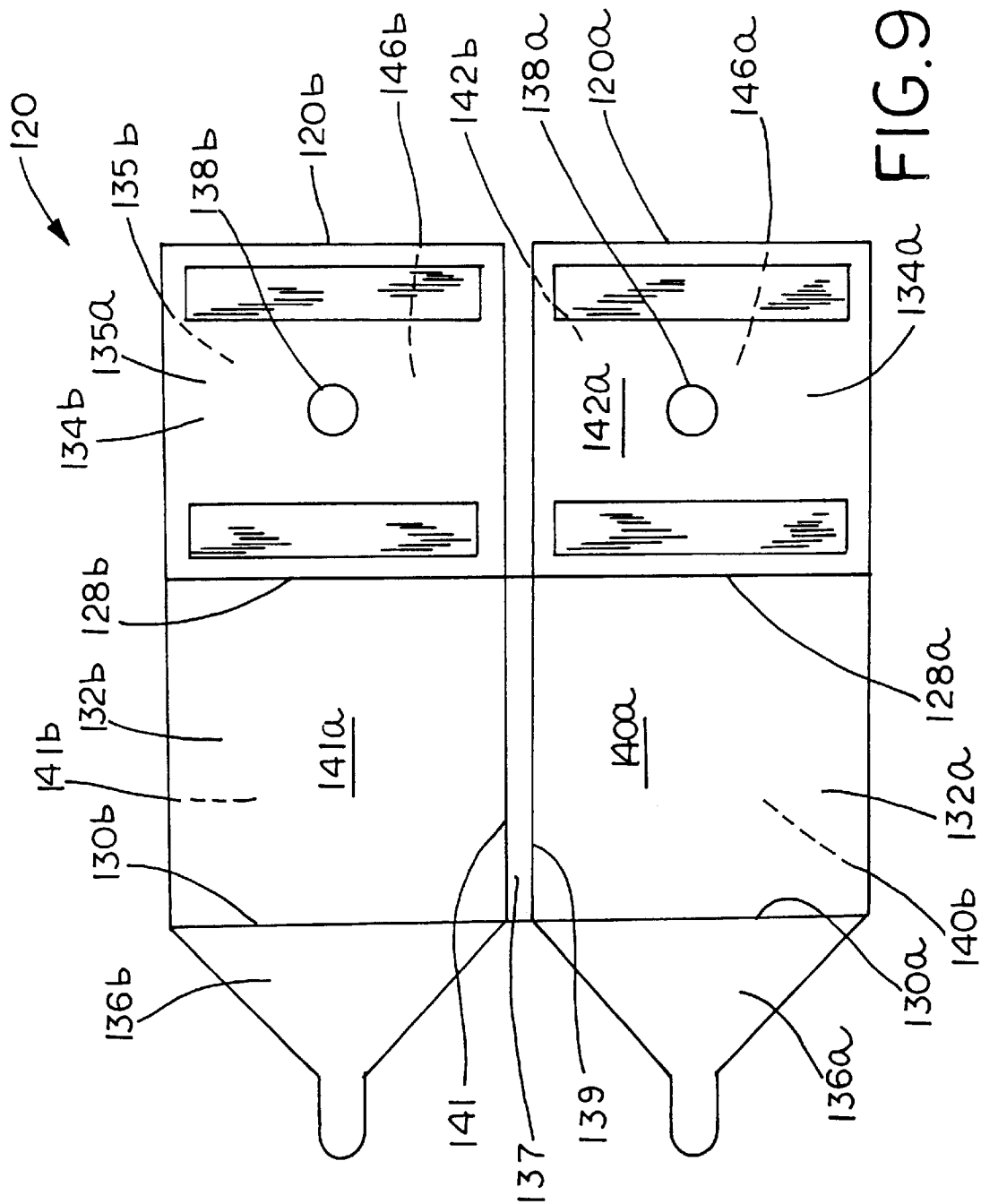
FIG. 9 is a plan view thereof and illustrating the device in its flat or unfolded state.
Figure 10:
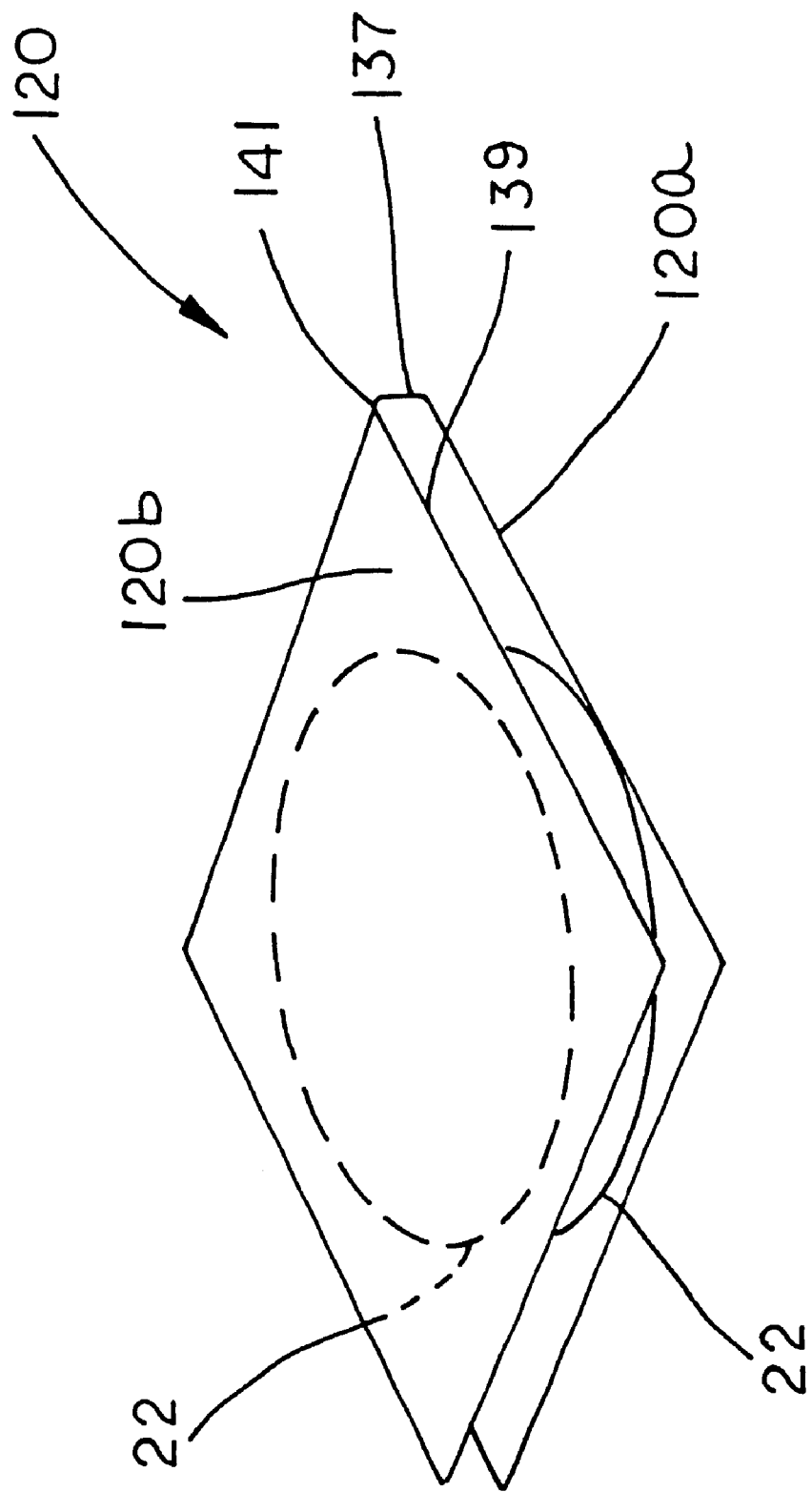
FIG. 10 is a perspective view similar to FIG. 8 but illustrating the device in a fully folded state and storing therein a pair of CD's.

Referring now to FIGS. 8–10 of the drawings, a CD carrier constructed in accordance with the teachings of a second preferred embodiment of the present invention is generally referred to by the reference numeral 120. The CD carrier 120 may be used to carry a pair of CD's 22 of the type described above in conjunction with the embodiment of FIGS. 1–7.

The CD carrier 120 includes a pair sections 120a, 120b, with each of the sections 120a and 120b being substantially identical to the device 10 described above with respect to the first embodiment. Referring to FIG. 9, the section 120a includes fold lines 128a and 130a, which divide the section 120a into a plurality of panels 132a, 134a, and 136a. Similarly, the section 120b includes fold lines 128b and 130b, which divide the section 120b into a plurality of panels 132b, 134b, and 136b. The sections 120a and 120b are joined by an additional panel 137. The panel 137 meets the panel 132a at a fold line 139, and meets the panel 132b at a fold line 141.

The panels 134a and 134b are foldable with respect to the panels 132a and 132b along their respective fold lines 128a, 128b, while the panels 136a and 136b are foldable with respect to their adjacent panels 132a, 132b along the fold lines 130a and 130b. Both panels 134a, 134b include a receiving aperture 138a, 138b, respectively. The receiving apertures may have a diameter approximately equal to the diameter of the central aperture 24 of the CD 22. The panel 132a includes faces 140a, 140b, while the panel 132b includes faces 141a, 141b. The panel 134a includes faces 142a, 142b, while the panel 134b includes faces 135a, 135b. When the panels 134a, 134b are folded along the fold lines 128a, 128b to the position of FIG. 8, a receiving area 146a, 146b is defined on the faces 142b, 143b, respectively, which receiving areas 146a, 146b face upwardly in FIG. 8 As shown, the receiving areas 146a, 146b are each positioned to receive a CD 22. The panels 136a, 136b each include a protrusion 164a, 164b, respectively, which are substantially identical in all respects to the protrusion 64 described above with respect to the first disclosed embodiment, and thus neither of the protrusions 164a or 164b need be described further.

Referring to FIG. 8, upon folding the panels 134a, 134b along the fold lines 128a, 128b, two pockets 168a and 168b are created. The pocket 168a is defined between the panels 134a and 132a, while the pocket 168b is defined between the panels 134b and 132b. The CD's 22 may be secured to their respective receiving areas 146a, 146b in a manner identical to that discussed above using the protrusions 164a, 164b by folding and manipulating the panels 136a, 136b as described above. Finally, the sections 120a, 120b may be positioned as shown in FIG. 10 upon folding the device 120 along the fold lines 139 and 141.

FIG. 11 illustrates a CD carrier 220 similar in all respects to the CD carrier 20 discussed in detail above, but having an edge portion 221 adapted for mounting to a ring binder by inclusion of a line of perforations 223. Alternatively, the device 220 could be glued to a separate, perforated sheet (not shown).

FIGS. 12 and 13 illustrate a further CD carrier 320 assembled in accordance with the teachings of yet another disclosed embodiment of the invention. The CD carrier 320 includes a panel 332 and a panel 336 separated by a fold line 330. The panel 332 includes a protrusion 364 identical to that discussed above with respect to the first, second and third embodiments. The panel 332 includes a receiving aperture 338 and defines a receiving area 346. As shown in FIG. 13, the protrusion 364 secures the CD 22 adjacent the receiving area 346 similar to the manner described above, but without the inclusion of a pocket.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the claims is reserved.

What is claimed:

1. A device for carrying a plurality of compact discs, each of the compact discs having a central aperture, the device comprising:
    a pair of sections, each of the sections including a plurality of panels separated by a plurality of fold lines, each of the sections further including:
        a first panel and a second panel foldable along a first fold line to a confronting position, the first and second panels cooperating to form a pocket therebetween when in the confronting position, at least one of the first and second panels defining a receiving area and having a receiving aperture; and
        a third panel foldable along a second fold line to a folded position overlying the receiving area, the third panel including an elongated protrusion sized for insertion through the receiving aperture and into the pocket; and
    a divider panel separating the first and second sections, the divider panel joined to the first section by a third fold line and joined to the second section by a fourth fold line;
    thereby permitting a pair of compact discs to be secured in generally parallel relationship.

2. The device of claim 1, wherein, for each of the sections, the first panel and the second panel cooperate to define a pocket when the second panel is in the folded position, and wherein the protrusion is sized to extend into the pocket when the third panel is in the folded position.

3. The device of claim 1, wherein, for each of the sections, the first panel and the second panel cooperate to define a pocket when the second panel is in the folded position, and wherein the root section is defined by an elongated portion of the third panel, the elongated portion frictionally received in the pocket.

4. The device of claim 3, wherein the elongated portion includes a rounded tip, the rounded tip having a radius sized to match a radius of the circular inner edge of the compact disc.

5. The device of claim 1, wherein, for each of the sections, and in combination with at least one compact disc, the central aperture of the compact disc having a radius of about 0.75 centimeters, and wherein the first panel and the second panel cooperate to define a pocket when the second panel is in the folded position, and further wherein the protrusion includes a rounded tip having a radius of about 0.75 centimeters.

6. The device of claim 1, wherein, for each of the sections, at least one of the first panel and the second panel includes an adhesive strip, the adhesive strip disposed between the first panel and the second panel when the second panel is in the folded position.

7. The device of claim 1, wherein, for each of the sections, the second panel includes a first face and a second face, the first face including at least one strip of adhesive for securing the second panel in the folded position, the second face defining the receiving area.

8. The device of claim 1, wherein, for each of the sections, an edge portion of at least one of the first and second panels includes a plurality of perforations.

9. A device for carrying a compact disc having a central aperture, the device comprising:
    a compact disc having a central aperture;
    a paperboard blank having a plurality of fold lines dividing the blank into a plurality of panels;
    a first one of the panels and a second one of the panels foldable along a first one of the fold lines to a confronting position, the first and second panels cooperating to form a pocket therebetween when in the confronting position, at least one of the first and second panels defining a receiving area and having a receiving aperture, the receiving area disposed outside of the pocket, the receiving area except for the receiving aperture defined exclusively by a planar surface; and
    a third one of the panels foldable along a second one of the fold lines to a folded position overlying the receiving area, the third panel including an elongated protrusion sized for insertion through the receiving aperture, through the aperture of the compact disc, and into the pocket;
    the panels and the protrusion arranged so that the compact disc is secured adjacent the receiving area by inserting the elongated protrusion first through the central aperture of the compact disc, then through the receiving aperture, and then into the pocket.

10. The device of claim 9, the central aperture of the compact disc including a diameter, and wherein the elongated protrusion includes a root section having a dimension sized to match the diameter of the central aperture.

11. The device of claim 10, wherein the receiving aperture is has a dimension sized to match the central aperture.

12. The device of claim 9, wherein the elongated protrusion includes a rounded tip having a radius sized to match a radius of the central aperture.

13. The device of claim 9, wherein the protrusion includes a root section, and wherein a protrusion is deformed generally adjacent the root section upon the insertion of the elongated protrusion through the receiving aperture.

14. The device of claim 9, wherein the third panel is sized so that the root section of the elongated protrusion is disposed adjacent a centerline of the receiving aperture when the protrusion is disposed through the receiving aperture.

15. The device of claim 14, wherein the root section is sized to frictionally engage an inner edge of the receiving aperture.

16. The device of claim 9, wherein the elongated protrusion includes a root section and a rounded tip, and wherein at-least a portion of the elongated protrusion is frictionally engaged in the pocket.

17. The device of claim 9, wherein at least one of the first panel and the second panel includes an adhesive strip for maintaining the first and second panels in the confronting position.

18. The device of claim 9, wherein at least one edge of the paperboard blank includes a plurality of perforations.

* * * * *

UNITED STATES PATENT AND TRADEMARK OFFICE
CERTIFICATE OF CORRECTION

PATENT NO.    : 6,637,588 B1
DATED         : October 28, 2003
INVENTOR(S)   : Laura A. Stamer It is certified that error appears in the above-identified patent and that said Letters Patent is hereby corrected as shown below:

Column 11,
Line 38, delete "is has a dimension" and insert instead -- has a dimension --.
Line 58, delete "at-least" and insert instead -- at least --.

Signed and Sealed this

Thirtieth Day of March, 2004

JON W. DUDAS
*Acting Director of the United States Patent and Trademark Office*